United States Patent [19]

Dannelly et al.

[11] 4,117,801
[45] Oct. 3, 1978

[54] APPARATUS FOR SPRAY COATING DISCRETE PARTICLES

[75] Inventors: Clarence C. Dannelly; Charles R. Leonard, both of Kingsport, Tenn.

[73] Assignee: Eastman Kodak Company, Rochester, N.Y.

[21] Appl. No.: 694,757

[22] Filed: Jun. 10, 1976

[51] Int. Cl.² .............................................. B05C 5/00
[52] U.S. Cl. ...................................... 118/20; 118/24; 118/62; 118/303
[58] Field of Search ...................... 118/62, 303, 19, 20, 118/24, DIG. 5; 427/212, 213, 214; 264/117

[56] References Cited

U.S. PATENT DOCUMENTS

| | | | |
|---|---|---|---|
| 2,123,537 | 7/1938 | Marr | 118/62 X |
| 3,110,626 | 11/1963 | Larson et al. | 118/303 |
| 3,196,827 | 7/1965 | Wurster et al. | 118/62 X |
| 3,386,182 | 6/1968 | Lippert | 118/303 X |
| 3,411,480 | 11/1968 | Grass, Jr. et al. | 118/303 X |

*Primary Examiner*—John P. McIntosh
*Attorney, Agent, or Firm*—Malcolm G. Dunn; Daniel B. Reece, III

[57] ABSTRACT

Apparatus for spray coating discrete particles while the particles are suspended in a gas flow, the apparatus including a vertically disposed coating chamber; a gas receiving, compressing and accelerating enclosure open at the top and bottom, such as a truncated hollow cone, within the chamber and including therewithin coating and drying zones and forming on the outside thereof therebetween it and the inside wall surface of the coating chamber an annular storage zone for a load of the discrete particles; one or more gas shaping or aerodynamic structures centrally disposed in spaced relation below the truncated hollow cone defining therebetween with the apparatus inside wall surface an annular nozzle for a Coanda flow of upwardly moving gases substantially into the truncated hollow cone; a particle supporting screen between the truncated hollow cone and the aerodynamic structure(s); at least one spray nozzle extending above the central aerodynamic structure and projecting through the particle supporting screen for providing an atomized spray of coating material within the truncated hollow cone; and a source of upwardly moving gases from below the aerodynamic structure(s).

4 Claims, 6 Drawing Figures

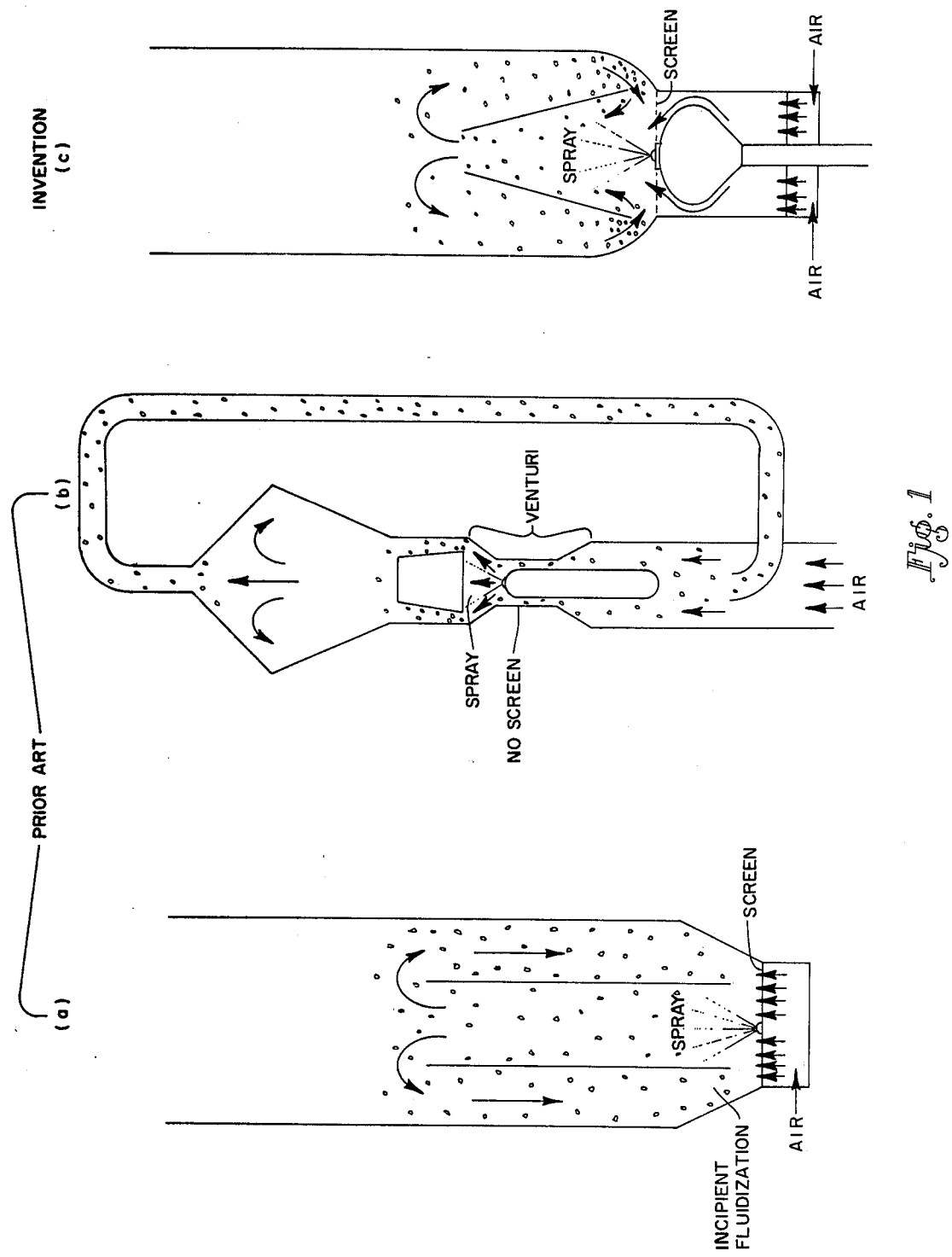

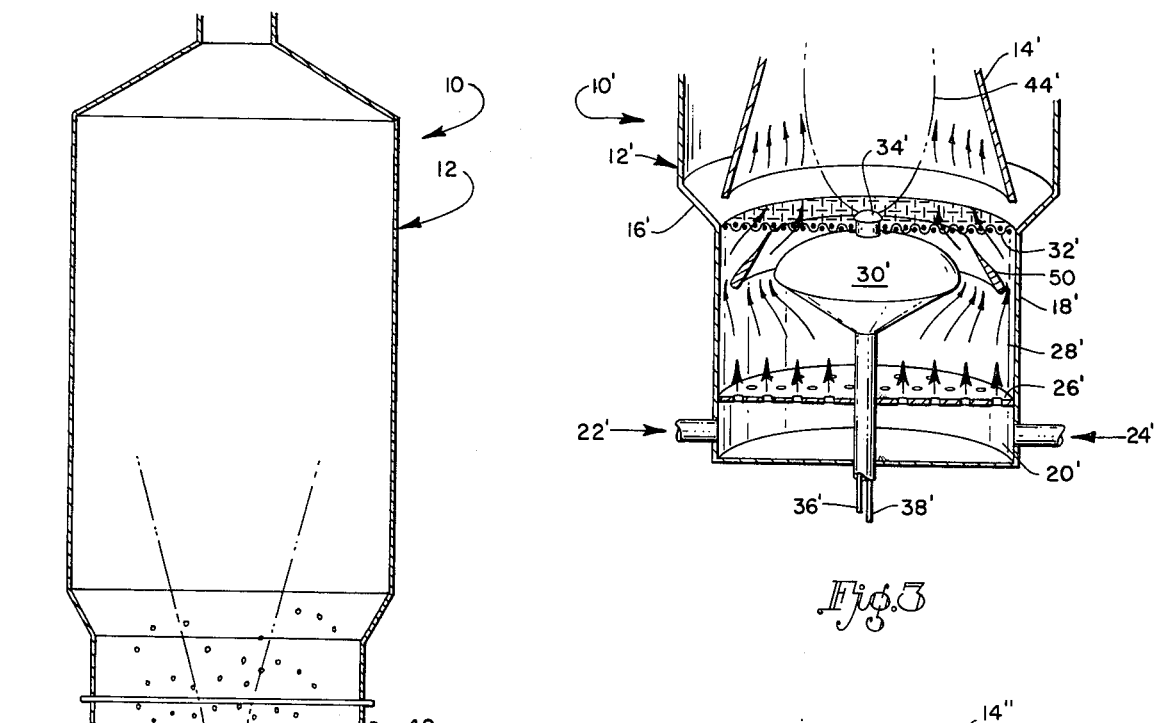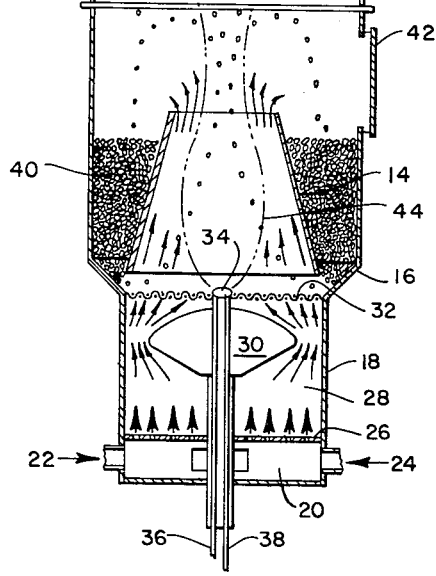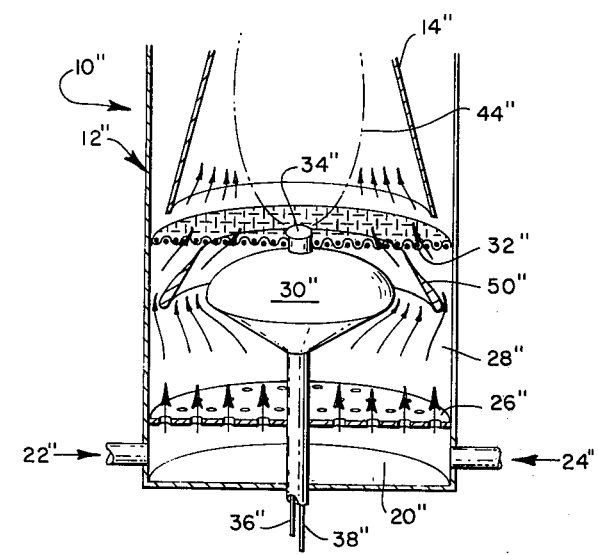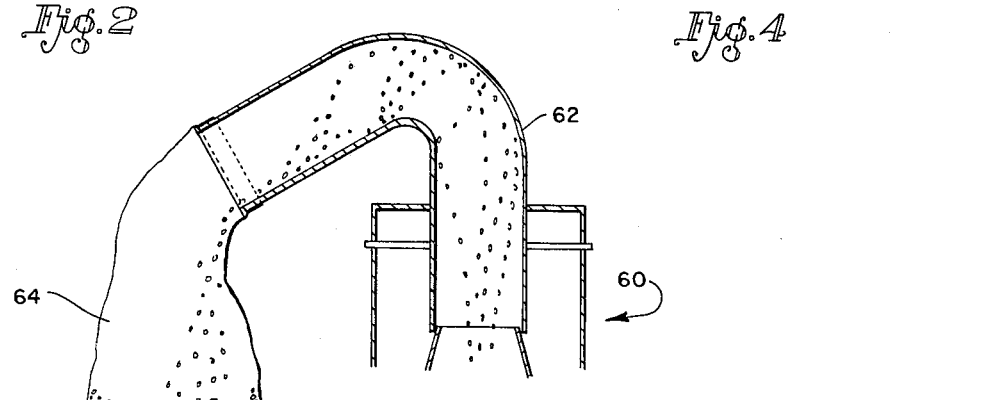

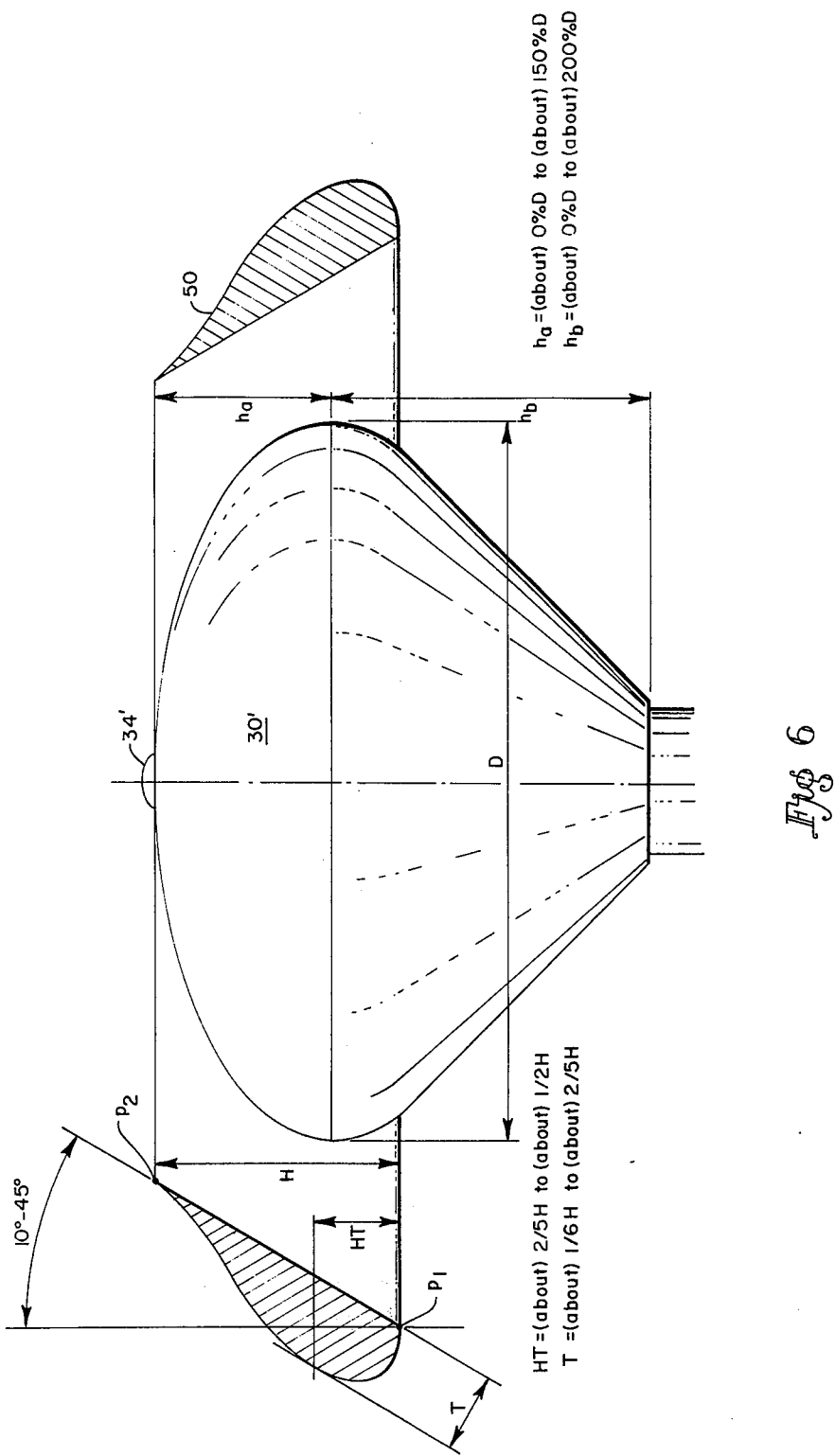

APPARATUS FOR SPRAY COATING DISCRETE PARTICLES

BACKGROUND OF THE INVENTION

This invention is directed to an apparatus for spray coating or encapsulating discrete particles or particulate objects while the particles or objects are suspended in a gaseous fluid such as air. The discrete particles or particulate objects to be spray coated or encapsulated may be particles or objects of nutrients, therapeutic substances, seeds, fertilizers, pesticides, herbicides, rodenticides and the like. The coating or encapsulation materials serve to protect, preserve and enhance appearance or possibly engender special properties such as rumen-stable coatings releasable post-ruminatingly as feed supplements for ruminant animals.

In the processes involving encapsulation, the core material must be contained or "encapsulated" in some manner and then may be released upon demand. The processes in the art may use free-flowing solids and film-forming polymers having a release mechanism that may be based upon pH changes, temperatures, solubility, mechanical forces, light or permeability of the film.

Products, which are inherently tacky or are not normally free-flowing, can be encapsulated so as to obtain free-flowing discrete particles.

Low melting solids, waxes and liquids can be solubilized, dispersed or otherwise incorporated into a polymer matrix and then applied onto any suitable core material. Low vapor pressure liquids, although not directly capable of being encapsulated, can be encapsulated by absorbing them first onto a porous particle before encapsulating.

In the field of agriculture, seeds have been encapsulated for specific applications involving moisture and temperature conditions and to alter physical characteristics without affecting germination and growth. Insecticides, fungicides, herbicides and innoculants have been incorporated into encapsulation formulations. More acceptable rodenticides have been developed through encapsulation techniques. The release of pesticides can be controlled by use of resin films as the encapsulating material. Slow release insecticide fungicide systems have been developed that place the insecticide or fungicide on the seed and protect the plant for longer periods of time.

In the food processing industry, encapsulation can be used to provide stability during processing or to release an active ingredient, such as flavor, leavening agent, or acidulant, at a particular point in the process. Packaging can be simplified in some instances where an incompatible ingredient is encapsulated and packaged with the balance of the mixture. Oily materials may be encapsulated by absorbing them onto a suitable base before coating or by including them as part of a coating being applied. Partial coatings can be effective anti-caking treatment and may also serve as a means to apply colors, surfactants, essential oils and trace additives with a high degree of uniformity. Solid particles may be coated to retain a desired texture, greatly retard either hydration or dehydration, improve handling characteristics of both powders and larger particles, or possibly simply to improve the appearance of a product. Taste-masking ingredients, which add offensive flavor, or the stabilization of desirable flavor, have been used either by direct encapsulation or by inclusion in the coating matrix.

In the pharmaceutical field, encapsulation processes are used for purposes of stability, masking of taste and odor, timed release and for enteric properties. For instance, in the use of film-forming materials, a low melting semi-crystalline lipophilic compound may be first coated onto a particle which has a high affinity for the compound, such as a polyethylene glycol wax. Then these particles are encapsulated with a hydrophilic film that has a low affinity for the compound. The substrate and encapsulating ingredients thus work together to protect the compound from its environment.

Examples of coatings that have been used in the art include methyl and ethyl methacrylates, cellulose acetate phthalate, carboxymethyl and ethyl cellulose, polyethylene, polyvinyl acetate, polyvinylidene chloride, polyvinyl alcohol, polystyrene, cellulose propionate morpholinobutyrate, polymers of vinylpyridine and derivatives of vinylpyridine, copolymers, mixtures of polymers with other polymers and/or pigments, fillers, plasticizers, etc., beeswax, carnauba, castor wax, paraffin, corn syrups, dextrins, molasses, fats, gelatins, glycerides, glycols, gums, lecithin, stearates, sucrose, proteins, shellac, starches, and a host of others that could be mentioned.

PRIOR ART PROCESS COMPARISONS

One type of coating process used in the industry, such as in the pharmaceutical industry, is the fluidized-bed coating process. This process involves supporting particles in a vertical column by an upwardly moving air stream. The coating solution is atomized and sprayed onto the air-suspended particles, and the particles are dried while suspended by the air. The velocity of the air stream is adjusted so that the air-suspended particles are maintained in a relatively confined working region of the column. The drying time of the applied coating can be governed by controlling either the atomization rate, the temperature of the supporting air stream, or both. Such a process is disclosed in the Wurster patents, such as U.S. Pat. Nos. 2,648,609 and 2,799,241.

The apparatus that has been customarily employed for practicing a fluidizing process generally comprises a vertical column, which is constricted at the bottom and expanded at the top. A screen usually extends across the bottom and through which the fluidizing air or gas passes in an upward direction. The air velocity in the constricted portion is such that particles entering this portion are immediately propelled upwards. The air velocity becomes greatly decreased in the expanded portion of the column so that the air velocity will not support the particles and they fall to the central or working region of the column. The working region is thus the area where the atomized coating is applied to the particles while they are air-suspended. The Wurster et al U.S. Pat. No. 3,207,824 discloses an apparatus of the general physical and functional configuration described in which the fluidizing process is practiced; similarly also, the Wurster et al U.S. Pat. No. 3,196,827 (note the description given in column 1, lines 46–70). The latter patent discloses a chamber, which is provided with a partition to divide the chamber into two zones, C and S. The partition separates the coating zone (C) from the "subsidence" zone (S). The particles move upwardly in zone C and move downwardly in zone S countercurrent to the upwardly flowing gas streams. The partition is elevated a few inches above the screen, through which the upwardly flowing gas streams pass, so as to allow for passage of the particles underneath the partition from the subsidence zone to the coating zone. The partition only extends high enough in the chamber to allow the particles to pass over its top from the coating zone before the energy of the upwardly flowing gas streams becomes insufficient to lift the particles higher in the chamber.

Reported disadvantages of the fluidized-bed coating process include a significant degree of tablet abrasion and coating material loss when used in the pharmaceutical industry. Also, the large volumes of fluidizing air result in high energy requirements and the need for pollution control equipment of larger capacity. See "Film coating: 2 Processing equipment" by J. F. Pickard and J. E. Rees, Sandoz AG. in Manufacturing Chemist & Aerosol News, May, 1974, pages 42, 44 and 45.

Another apparatus for practicing a fluidized coating process is disclosed in the Larson et al U.S. Pat. No. 3,110,626. The disclosed apparatus differs in several respects from the apparatus disclosed in the afore-mentioned Wurster and Wurster et al patents. The patent discloses a vertically positioned coating chamber, a control element adjustably mounted in the base region of the coating chamber, a venturi tube connected to the base of the coating chamber, an axially positioned atomizer assembly within the throat region of the venturi and a gas foil guidance element positioned around the atomizer assembly. The screen shown in the Wurster and Wurster et al patents has been eliminated in the Larson et al patented apparatus because the use of the venturi makes it possible for the particles to be partially supported in the coating chamber by the gas stream moving from the venturi without the need for a screen. The venturi serves to provide an increase in velocity of the gas stream passing through it. It is stated that the adjustably mounted control element may be in the shape of a cone or a cylinder. In the use of a cone, the base of the cone is larger in diameter than its top. The control element also serves as a partition, as in the Wurster and Wurster et al patents above, to separate the upgoing particles in the coating zone from the downcoming particles. The control element in cooperation with the walls of the neck of the coating chamber and the exit cone of the venturi provide for an annular bed of particles from which particles are circulated up through the control element for coating and down in return to the annular bed of particles. The frictional effect of the combined walls of the coating chamber neck 28, cone 75 and the exit cone 36 of the venturi, as well as the upwardly flowing gas stream, support the particles at any given instant in the annular bed. The gas foil guidance element 48 is placed around the atomizer assembly and is axially mounted within the throat region of the venturi so as to streamline the gas flow up through the venturi region and avoid unnecessary turbulence while increasing the gas flow velocity.

A primary disadvantage of the Larson et al patented apparatus is that upon scale-up in size of the apparatus so as to handle larger and larger quantities of particles and other materials to be coated, the energy requirements for the air or gas stream flow become enormous. This is mainly due to the necessity for using the air or gas stream to partially support the particles in the annular bed or temporary storage area, which lies between the wall of the coating chamber and the exterior wall of the control element, as well as to lift and circulate the particles up through the conical or cylindrical control element.

SUMMARY OF THE INVENTION

The apparatus of the present invention is somewhat broadly similar in basic construction to that of the prior art in that there is a vertically disposed coating chamber; a gas receiving, compression and accelerating enclosure open at the top and bottom, such as a truncated hollow cone, which is adjustably positioned in a vertical direction within the coating chamber; an atomizer assembly adjustably positioned in a vertical direction below the coating chamber for extending within the coating chamber and for providing an atomized spray of liquid coating material upwardly into the truncated hollow cone; a particle supporting screen extending transversely across the base of the coating chamber with a central opening provided therein so as to enable the atomizer assembly to extend adjustably upwardly therethrough; and a source of upwardly flowing gases from below the coating chamber and into the coating chamber. The apparatus of the invention, however, departs from the prior art by providing below the coating chamber and above the source of the upwardly flowing gases one or more gas shaping or aerodynamic structures which compress and focus substantially all of the upwardly flowing gases for upward flow into the truncated hollow cone. In other words, no gases are, or energy is, required to support the particles that are resting temporarily in the outer annular area that extends around the exterior wall of the truncated hollow cone.

The particles are forced upwardly into the truncated cone; a spray coating application of desired material is applied while the particles are suspended within the truncated cone by the upwardly flowing gases; the wetted particles are dried by the upwardly flowing gases while suspended within the cone; and the particles exit through the upper open end of the cone into the chamber wherein the gases expand and the particles lose their upward momentum and fall by gravity to the outside wall surface of the truncated cone into the temporary annular storage bed. A reduced gas pressure adjacent the bottom edge of the cone causes the temporarily stored particles to be readily drawn from the bottom of the annular storage bed into the stream of the upwardly flowing gases and into the truncated cone for repeated spray coating application and drying, and for subsequent return to the annular storage bed. The recycling of the particles is permitted to occur a number of times determined by experience, depending upon the particle size and surface and the nature of the material being spray coated, until a predetermined coat thickness is achieved.

The flow upwardly around the aerodynamic structure(s) constitutes an annular flow. Since it has a certain momentum, or product of mass-flow and velocity, its emergence beyond the aerodynamic structure(s) into the coating chamber is in the form of a jet into the region of a lower pressure. The flow of the jet tends to produce a low pressure region in the vicinity of the jet emergence into the coating chamber so that the surrounding fluid and the particles from the annular storage bed are induced to flow toward the jet and become entrapped by the jet.

In the invention a sharp discontinuity occurs along the gas flow path between the aerodynamic structure(s) and the adjacent sidewall of the coating apparatus. The sharp discontinuity is a consequence of the aerodynamic structure as its upper surface leads sharply away from the adjacent side wall surface, and facilitates the adhesion of the upward gas flows to the surface of the aerodynamic structure(s) so that the flow of upwardly moving gases is compressed and focused to pass upwardly through the truncated cone. The adhesion of the upward gas flow to the surface(s) of the aerodynamic structure(s) is in the nature of a Coanda flow or "Coanda effect". The "Coanda effect" is named for the tendency of a fluid, either gaseous or liquid, to cling to a surface that is near an orifice from which the fluid emerges. An important part of the effect is the tendency of the primary flow of gas or liquid to entrain, or draw in, more gas or liquid from the surrounding environment.

DESCRIPTION OF THE DRAWINGS

In the drawings:

FIG. 1 is an illustration of a comparison of the gas flows in two prior art apparatus with the gas flow in the apparatus of the invention to show the differences not only in the gas flows but also in the construction;

FIG. 2 is an elevation view in cross-section illustrating the apparatus of the invention and showing the gas flows and particle flow path from the annular bed to and through the truncated hollow cone and in return to the annular bed;

FIG. 3 is a partial elevation view in cross-section of a modified apparatus and illustrating the addition of an annular airfoil and showing the flow of gases relative to the aerodynamic structure and annular airfoil;

FIG. 4 is a partial elevation view in cross-section of another modified apparatus similar in all other respects to the modification shown in FIG. 3 except that the cross-section of the apparatus below the coating chamber is of the same diameter as that of the coating chamber;

FIG. 5 is a partial elevation view in cross-section of the upper portion of the apparatus of invention for illustrating one possible manner of collecting the finally coated particles by use of an air porous bag; and FIG. 6 is a graphic illustration of the height, thickness and angular relationships of the annular airfoil with respect to the aerodynamic structure, and the height above ($h_a$) and height below ($h_b$) relationships of the aerodynamic structure to the greatest cross-sectional diameter of the aerodynamic structure.

DESCRIPTION OF THE PREFERRED EMBODIMENT

In order to further understand the differences in the prior art and the invention herein disclosed, reference is first made to FIG. 1(a), in which the general features of one of the embodiments shown in U.S. Pat. No. 3,241,520 (Wurster) are illustrated. The coating apparatus is vertically disposed, has a gas inlet at the bottom of the chamber and a gas outlet at the top of the chamber. Centrally disposed within the chamber is a vertically extending partition, which is normally impervious to the flow of gas therethrough and serves to divide the chamber into two zones in open communication both at the top above the partition and at the bottom below the partition. A gas distributing arrangement is spaced below the lower end of the partition and may be in the nature of a screen of varying mesh sizes or a perforated disc. When particles to be coated are disposed within the chamber, gas may be supplied in sufficient amount through the gas distributing arrangement to lift the particles upwardly in substantially non-turbulent flow.

An atomizing nozzle, which is connected to a coating material supply system, sprays a coating solution or fluid in finely divided form into the high velocity gas stream to impinge on the particles carried in the gas stream. The atomizing nozzle is centrally disposed with respect to the screen. As discussed in the Wurster et al patent, U.S. Pat. No. 3,241,520, the therein disclosed gas distributing arrangement defines areas of differing volumetric gas-delivering capability and is designed to establish a greater upward velocity of gas in the coating zone than in the subsidence zone. The higher velocity gas or air passes upwardly through the partition with the entrained particles and then diffuses outwardly from the coating zone after it has reached the top of the partition whereby its velocity decreases. The entrained particles pass over the upper end of the partition and settle downwardly in substantially weightless contact in the subsidence zone against the stream of gas moving upwardly through the subsidence zone.

The Wurster et al patent points out that the configuration of the gas distributing arrangement is further designed so that a volume of gas is delivered to the space which is defined in the chamber by the gas distributing arrangement and a horizontal projection taken along the bottom of the partition which is in excess of the amount of gas required to induce "incipient fluidization" ("the point at which particles which are disposed in a bed in a closed chamber through which a gas is being passed upwardly become suspended in the gas stream and gain some freedom to move") of the bed of discrete particles disposed within the chamber. The gas distributing arrangement in cooperation with the partition induces a horizontal gas flow vector in the space under the subsidence zone defined by the gas distributing arrangement and a horizontal projection of the lower end of the partition, which causes the excess gas in the defined space to move horizontally in that space and into the coating zone to combine with the upwardly flowing stream of gas in the coating zone. The discrete particles, which are descending in substantially weightless contact (at the point of "incipient fluidization") in the subsidence zone are transported by the horizontal air vector under the lower end of the partition and into the coating zone where they are carried upwardly by the high velocity gas stream for repetitive cycling in the apparatus. As still further explained by the patentees, part of the gas is directed by the gas distributing arrangement into the coating zone at fairly high velocity, carrying particles from the bottom of the subsidence zone or bed and up into the coating zone. The dense bed of particles in the subsidence zone increases the resistance to upward gas flow through the subsidence zone, thereby tending to shunt some of the gas attempting to enter the bottom of the bed in the subsidence zone over to the coating zone along with associated particles to be coated. Such "shunting" induces the horizontal gas vector (mentioned above).

In reference now to FIG. 1(b) in which the general features of the Larson et al U.S. Pat. No. 3,110,626 are illustrated, the disposition of the vertical apparatus, the partition separating the coating zone from what the Wurster et al patent described as being the "subsidence zone", the central location of the spray nozzle beneath the partition and the source of the gas flow from below the partition are generally somewhat similar to that disclosed in FIG. 1(a). The configuration of the partition is a truncated cone or "conical section", as compared to the cylindrical partition illustrated in FIG.

1(a), and is vertically translatable. The partition may also be cylindrical, as described and illustrated in the patent. The coating chamber is described by the patentees as being "funnel-shaped", which of course contrasts with the configuration illustrated in FIG. 1(a). There is no screen because, as previously discussed above, the venturi attached to the base region of the apparatus is described as making it possible for the particles to be supported in the chamber above the spray nozzle without the use of the screen. The use of a screen is otherwise described as causing considerable pressure drop. The absence of the screen also enables the patentees to provide for a somewhat different path of circulation for a portion of the particles where some of the particles pass up or exhaust through the top of the chamber into a conduit for subsequent return into the chamber from below the spray nozzle. This is an independent recirculation apart from the recycling of particles occurring within the coating chamber.

The venturi, which is located at the base region of the apparatus, is described as causing a drop in pressure and an increase in velocity of the gas stream passing through the venturi. A vertically translatable gas foil guidance element is axially positioned within the venturi, and the spray atomizer assembly is mounted within the gas foil guidance element. The guidance element is described as serving to move the gas stream about itself within the venturi without disrupting gas flow and creating disturbances, especially within the throat region of the venturi; and also as serving to avoid unnecessary turbulence while increasing the gas flow velocity.

The partition, which may be cone-shaped or cylindrical, is described as providing a barrier between upcoming and downcoming circulating particles, and as enabling the maintenance of an annular bed of discrete particles being coated in the region between the exterior wall of the partition and the interior wall of the coating chamber neck. The weight of a large portion of particles at any given instant is described as being supported by the combined walls of the neck, cones, and exit cone of the venturi.

FIG. 1(c) discloses the general configuration of the preferred embodiment of the invention. One of the essential differences over the prior art is the character of the gas flows over the surface of the centrally positioned aerodynamic structure, all significant gas flows being compressed and directed into the truncated hollow cone. Another difference is the aerodynamic structure per se, and still another difference, as previously mentioned, is the sharp discontinuity provided along the gas flow path between the aerodynamic structure and the adjacent side wall of the coating apparatus as a consequence of Coanda flow and of the upper aerodynamic surface leading sharply away from the adjacent side wall surface.

The truncated hollow cone is also believed to be somewhat of a departure from and of greater significance than that disclosed in the Larson et al U.S. Pat. No. 3,110,626. In the patent it is stated that the pitch or slope of the walls of the control element, which control element may be either a cone or cylinder, "is such as to maintain the gas velocity at any given point in the element at a level which is greater than that necessary to move any given average type of particle being coated in a continuous upward direction." (See column 8, lines 31–37). In other words, the particles are being given a constant acceleration, which would appear to be due to the rate at which the gas is flowing upwardly sufficient to propel the particle upwardly through the conical or cylindrical "control element". Since the patentees optionally rely on either a cone-shaped or a cylindrical-shaped control element, it would then appear clear that the control element only serves the same purpose as the "partition" disclosed in the Wurster U.S. Pat. No. 3,241,520: to provide for the annular storage zone or bed and to separate the coating zone from the storage zone.

The invention in this case, however, employs a truncated hollow cone in which the slope or pitch of the walls is such that the particles are accelerated at an increasing rate and not just at a rate so as to maintain the gas velocity at any given point in the cone at a level greater than that necessary to move the particles in a continuous upward direction. The slope or pitch of the walls would therefore appear to be more pronounced than the slope or pitch of the cone embodiment disclosed in the Larson et al patent. The significance of the slope or pitch of the truncated hollow cone of the invention is that when a particle first enters the cone at one rate of speed, it is then accelerated to a different rate of speed and continues to be accelerated to still different rates of speed as it moves upwardly through the cone. In this manner a separation is brought about between the particles so that after they are coated they may become sufficiently dry before coming into contact with other particles and thereby avoid undesirable clumping or agglomerating together. The Larson et al patent does not disclose this nor discuss this feature, and appears to pitch the slope of the walls of the cone that is disclosed only sufficiently to maintain the gas velocity in the manner quoted above. If it had been a significant feature in the patent, then it is thought that the patentees would not have also disclosed a cylindrical control element. In the invention herein disclosed, however, the pitch or slope is such as to cause a compression of the gas molecules and thereby cause the acceleration at an increasing rate. Although there would be somewhat of a compression of the gas molecules in the Larson et al cone-shaped control element, it appears to be only to the extent as to maintain the gas velocity so that the particles are only given a constant acceleration and thus probably overcome any possible loss of gas velocity as the gas flows upwardly. This appears to be the significant difference between the two disclosures, insofar as the cone-shaped partitions are concerned.

In reference to FIG. 2, the details of the invention will now be described. The coating apparatus is designated in general at 10 and includes a vertically disposed first hollow column 12 of regular shape. By "regular shape" is meant that it may be cylindrical, octagonal, hexagonal or of other configurations, so long as the hollow column is generally symmetrical with respect to its central axis. The hollow column contains therewithin the particle storage, coating, drying and deceleration zones, which will be described herein.

A truncated hollow cone 14, which may also be a tapered octagon or other tapered polygonal configuration, in other words, generally cone-shaped configurations, serving as an enclosure in which the upwardly flowing gases are received, compressed and accelerated, is centrally disposed within the first hollow column, has a uniformly decreasing cross-section in the upward direction and is of predetermined height dependent upon the size and weight of the particle to be treated. Within the truncated hollow cone in ascending order are the coating and drying zones. The cone serves also to separate the coating and drying zones from the deceleration zone, which lies in the region above the upper end of the cone, and from the storage zone, which lies therebetween the cone and the interior wall surface of the first hollow column.

The first hollow column 12 is provided at its lower end with an inwardly tapered base 16. The lower end of the truncated hollow cone is spaced radially inwardly from the inwardly tapered base.

A second vertically disposed hollow column 18 of regular shape is connected to the inwardly tapered base of the lower end of the first hollow column, the wall surface of the inwardly tapered base forms a juncture with the wall surface of the second hollow column.

Disposed within the second hollow column is a first plenum chamber 20 into which a suitable compressed gas, such as air, may be provided through two or more opposed inlets 22, 24; a gas or air collimating plate 26; a second plenum chamber 28 separated from the first plenum chamber 20 by the collimating plate 26; at least one gas shaping or aerodynamic structure 30 disposed within the second plenum chamber; and a particle support or supporting screen 32, which extends across the second hollow column and is located above the aerodynamic structure.

The gas or air collimating plate 26 is a perforated plate which causes the gas or air in the first plenum chamber to pass into the second plenum chamber in an essentially vertical and uniform flow, as illustrated by the vertical arrows.

The gas shaping or aerodynamic structure 30 in cooperation with the adjacent wall surface of the second hollow column, compresses and focuses the upwardly moving gas or air flow so that it flows over a portion of the surface of the aerodynamic structure, upwardly through the particle support screen and into the entrance end of the truncated hollow cone. The flow upwardly around the aerodynamic structure constitutes an annular flow, which adheres to the surface of the aerodynamic structure in the nature of a Coanda flow.

A spray nozzle 34 preferably extends above the top of the aerodynamic structure 30 through which is sprayed a suitable coating material. It is more convenient to have the spray nozzle located at the top of the centrally disposed aerodynamic structure. The coating material is supplied from a suitable source (not shown) through a conduit 36 extending up through the aerodynamic structure, and an atomizing gas may be supplied from a suitable source (not shown) through a conduit 38, also extending up through the aerodynamic structure, for subsequent mixing at the nozzle. The spray nozzle may also be pressure-operated rather than gas-operated.

The upper surface of the gas shaping or aerodynamic structure is centrally disposed within and extends generally horizontally across the cross-section of the vertically disposed hollow column. In other words it has a cross-sectional plane generally perpendicular to the vertical axis of the vertically disposed hollow columns. The outer edge of the upper surface is equally spaced from the wall surface of the hollow column and defines therebetween with the wall surface of the hollow column a reduced pressure region for acceleration in velocity of the upwardly flowing gases in such manner that the upwardly flowing gases form a boundary layer that is directed away from the wall surface of the hollow column and that adheres to the upper surface of the gas shaping or aerodynamic structure for flow across a portion thereof.

The upper surface of the aerodynamic structure may be flat (not illustrated), but is preferably curved or approximately spherical as illustrated. It may have a height ($h_a$) above the cross-sectional plane (see FIG. 6), therefore, of from about 0% to about 150%, or preferably from about 10% to about 150% of the greatest cross-sectional diameter (D) (See FIG. 6) of the aerodynamic structure.

The surface below the greatest cross-sectional diameter may also be flat (not illustrated) and may therefore have a depth or height ($h_b$) below of from about 0% to about 200% of the greatest cross-sectional diameter (D) (See FIG. 6). Preferably, the surface below is formed in the manner disclosed in the drawings.

The aerodynamic structure as disclosed and as described is thus adapted to compress and accelerate the flowing gases near the periphery of the hollow column and direct them toward the center of the hollow column at an angle from about 10° to about 45° from a direction parallel to the flowing gases from the gas or air plenums.

The truncated hollow cone defines at its lower end a large diameter somewhat smaller than the diameter of the vertically disposed first hollow column, and has an increased diameter from about 0% to about 25% greater than that of the plane of the particle support screen. The lower end of the truncated hollow cone is spaced a predetermined amount from the screen and the upper end defines a diameter of from about 20% to about 80% of that of the lower end. The height of the cone ranges from about one to about six times the diameter of the lower end.

OPERATION

In operation, particles 40 may be suitably loaded into the coating apparatus 10, as through a closable opening at 42, into the storage zone lying between the wall surface of the first hollow column 12 and the outside wall surface of the truncated hollow cone 14. The particles are thus situated in an annular bed around the truncated hollow cone 14. The sloping outer wall surface of the truncated hollow cone, the inwardly sloping tapered base 16 of the first hollow column and the screen 32 serve to contain the particles in the annular bed prior to starting-up the coating operation. It should be understood that the manner of loading of the particles may vary without departing from the scope of invention since it is incidental to the invention.

The gas or air is turned on to start the circulation of the particles or pellets from the annular bed or storage zone into the coating, drying and deceleration zones and in return to the upper portion of the annular bed. The atomizing spray is then turned on and appropriately adjusted in a suitable manner by controls (not shown).

As previously pointed out, the Coanda flow or effect is named for the tendency of a fluid, either gaseous or liquid, to cling to a surface that is near an orifice from which the fluid emerges. Such "orifice" in this instance is formed in the region therebetween the closest approach of the aerodynamic structure to the adjacent side wall surface. The gas flow emerging from the "orifice" region around the aerodynamic structure is an annular flow which clings or adheres to the surface of the aerodynamic structure. The flow, therefore, from any one selected location around the "orifice" is opposed by the other flows so that it is prevented from continuing further over the upper surface of the aerodynamic structure by being forced upwardly away from the upper surface at some point for flow into the truncated hollow cone. A partial vacuum is formed in the region just above the upper surface of the aerodynamic structure and at the lower edge of the truncated hollow cone and this aids in the compression and focusing of the rising annular flow of gases. The upward flow is consequently caused to have a conical shape, as seen in phantom lines in FIG. 2 at 44 within the cone, and has a centering effect on the particles impelled upwardly through the cone.

As also pointed out, an important part of the Coanda effect is the tendency of the flow of gas or liquid to entrain, or draw in, more gas or liquid from the surrounding environment. In this latter manner, the particles are pulled from the annular bed or storage zone into the upwardly flowing gas due to the aforementioned partial vacuum or reduced pressure region that exists just above the screen adjacent the path of upward flow as a consequence of this Coanda effect. This reduced pressure or partial vacuum is directed perpendicular to the annular airflow from the "orifice". It is a different effect, however, from the horizontal shunting action occurring in the Wurster et al apparatus described above because there the horizontal shunting would extend not only toward the axis of the apparatus but also inefficiently toward the outer wall surface of the coating apparatus.

Once the particles are pulled into the upwardly flowing gas within the truncated hollow cone, they are impelled upwardly in an accelerating gas or air stream. As the particles pass through the lower central region or coating zone within the cone, they are contacted with an atomized spray coating of material. This atomized spray emerges from the spray nozzle 34 because the liquid coating substance is either forced through a single orifice designed to convert bulk liquids into droplets, or the liquid and an atomizing air stream emerge simultaneously from jets adjacent to each other. In either case, the fine droplets of coating material are in a flowable state, because the material is dissolved or melted, in the region immediately above the spray nozzle.

Further up the truncated hollow cone, the liquid nature of the coating material, as deposited on the pellets or particles, changes to solid by evaporative or other solidification processes. During the transition from liquid to solid, the coated particles pass through a stage when they are sticky or tacky and would agglomerate if they contacted each other. This contact is prevented by the slope or pitch of the walls of the truncated hollow cone and consequent accelerating boost of the particles to separate them in the manner previously discussed.

The conical nature of the cone causes a compression and acceleration of the rising column of gases and the upward velocity or acceleration of the particles occurs at an increasing rate as they rise in the cone. This acceleration causes an increasing vertical separation in space between the particles and therefore reduces the tendency for the particles to contact each other until the coating has become nontacky. It is this region of the cone that is thus called the "drying zone".

When the compressed gases and entrained particles pass upwardly out of the upper end of the cone, they expand into the larger area of the upper portion of the first hollow column and thus decelerate to a velocity too low to suspend the particles. This is the deceleration zone, where further drying takes place, and the particles then fall by gravity action to the annular bed where they gradually move down, also due to gravity, until they are pulled into the coating zone again. This recycling or recirculation continues until, based upon previous experiments, a sufficient coating has been applied.

The atomized spray is turned off, and the gas or air entraining flow may be shut down or may be increased to drive the coated particles into the uppermost region of the first hollow column, as for collection in the manner illustrated in FIG. 5. Any other suitable manner of unloading the finally coated particles may also be used without departing from the scope of the particular invention disclosed herein.

The following example will give some idea of at least one size of apparatus that may be employed, airflows, amount of pellets to be treated, coating material, nature of particles being coated, and other conditions.

EXAMPLE 1

A coating apparatus having the design characteristics, essentially such as shown in FIG. 2, and having a diameter of 8 inches across the lower end and 4 inches across the upper end of the truncated hollow cone is charged with 25 pounds of generally spherical pellets of animal feed supplement. The pellets are composed of 90% methionine and 10% binders. The average diameter of the spherical pellets is about 3 millimeter. About 250 standard cubic feet per minute of air at about 7 p.s.i.g. is admitted to the plenum chamber 20. This air causes a circulation of pellets through the truncated hollow cone 14, and the height of the cone above the support screen 32 is adjusted to obtain a pellet flow rate such that all the pellets in the annular storage zone move through the cone about once every minute. A coating solution composed of 6% cellulose propionate morpholinobutyrate in acetone is pumped through the spray nozzle 34 at the same time as 5 SCFM of atomizing air at 40 p.s.i.g. is supplied to the nozzle. The pumping rate is adjusted to pump 1 pound of solution per minute. The apparatus is operated for about 45 minutes. The product is a pellet core coated with about a 2-mil layer of the polymer. The pellet is useful as a feed supplement for ruminant animals because the polymer resists alteration by microorganisms in the rumen but is dissolved by higher acidity in the abomasum where the methionine is absorbed by the ruminant animal.

THEORY OF OPERATION AND COMPARISON WITH PRIOR ART

If the gases flowing upwardly around the aerodynamic structure could be seen as a series of layers of molecules, merely for sake of discussion, it is thought that there is an insignificant flow of molecules or layer or so of molecules along the interior wall surface of the second hollow column. By "insignificant" is meant that such layer or layers of molecules will not perform any supporting function of the particles in the annular bed, as is the case in the prior art apparatus illustrated in FIG. 1(a) and FIG. 1(b).

Moving, therefore, radially inwardly from the interior wall surface of the second hollow, the more significant layers of molecules are caused to bend toward the gas shaping or aerodynamic structure, the innermost adhering to the surface of that structure as they pass upwardly through the "orifice" region. This adherence of the molecules to the surface of the aerodynamic structure may be favorably compared to the "teapot effect", which is a low-speed form of the "Coanda effect". When water is poured slowly from a glass, it tends to stick to the side of the glass in the same way that tea sticks to the spout of a teapot. High speed fluids behave similarly and adhere to a surface of suitable shape.

As the rising molecules flow over the surface of the aerodynamic structure after having passed the "orifice" region, previously mentioned, at some point along the upper surface of the aerodynamic structure the opposing character of the annular flow forces the molecules upwardly away from the upper surface as well as the adjacent molecule layers. A partial vacuum is created above the aerodynamic structure due to the high speed upward flow of gases, causing an inward bending of the upwardly moving molecules.

In the Wurster et al apparatus, as shown in FIG. 1(a), the upward flow extends across the cross-section of the apparatus, as shown by the vertical arrows. Part of the air molecules pass upwardly through the annular bed so that they serve to counteract the weight of the particles returning to the annular bed. The particles are caused to be in a state of "incipient fluidization", as previously defined, and thus "dance" around in the annular bed until reaching the lower edge of the cylindrical partition where they are moved into the upwardly flowing column of molecules passing through the cylindrical partition. Some of the molecules, upon encountering the mass of particles in the annular bed are shunted horizontally or radially toward the interior wall surface and radially toward the central region of the apparatus. The effect upon the particles within the annular bed is a randomizing action of the particles gradually moving from the annular bed and into the region beneath the edge of the cylindrical partition where they are then moved upwardly within the column for coating, drying and subsequent deceleration and return to the upper region of the annular bed. The "dancing" of the particles in the annular bed causes a certain amount of attrition or wear of the particles upon or against each other.

In the invention herein-described, however, the particles move down in the annular bed by gravity without any "dancing" occurring, and are drawn into the upwardly flowing gases by the partial vacuum. Thus, any attrition that might occur is greatly minimized, and the overall operation is much more efficient.

In the Larson et al apparatus, as illustrated in FIG. 1(b), the gas or air flow through the venturi expands outwardly across the entire cross-section, as illustrated by the arrows, and aids in providing a necessary supporting function for the particles in the annular bed as well as an upward impelling effect upon the particles within the cone-shaped partition. The same shunting action occurs in Larson et al as was described in the Wurster et al apparatus above. This is apparently what Larson et al patent means when discussing the control element as providing a "desirable sharp discontinuity in the velocity profile of the particles in the coating chamber". (See column 3, lines 7-16.) In other words, the upwardly flowing gases meet resistance upon coming into contact with the particles in the annular bed, thereby resulting in the sharp discontinuity in the velocity profile. Some of the gases pass upwardly through the particles in the annular bed and thereby provide a supporting function. Other gases are shunted to the side wall and bounce back, while other gases flow more readily up through the control element. The same random action occurs, however, among the particles in the storage bed as in the Wurster et al storage bed. The particles are fluidized, can move a limited direction upwardly, sidewardly and finally downwardly within the storage bed until moving into the horizontally shunted air flow below the bottom of the bed for subsequent movement into the control element. Thus, there would also be a certain amount of undesirable attrition or wear of the particles upon or against each other as they "dance" about in the annular bed.

Also, as previously discussed, the slope or pitch of the walls of the cone in Larson et al does not appear to have as much compression effect, for the reasons previously mentioned, as would be true in the instant invention where the pitch or slope is more extreme. The Larson et al patent does not appear to be actually concerned with a compression effect in the sense that the inventors herein are concerned since a cylindrical partition or control element appears to be considered by the patentees to serve as well as the cone-shaped one.

One disadvantage of the Larson et al venturi approach is that as the size of the apparatus is increased to process greater and greater batch loads of particles, the necessity of using a portion of the upward air flow to partially support the annular bed results in a significantly greater amount of airflow to a point where the operation would not be deemed efficient. This would not be the case with the instant invention because the air or gas flow is only employed to impel the particles upwardly within the cone.

FIG. 3 EMBODIMENT

In reference to FIG. 3 in which a modification of the invention herebefore described is disclosed, the same reference numbers will be used to identify similar elements previously described, except that they will be primed to show that it is a different embodiment under discussion.

FIG. 3 represents an embodiment of the invention wherein the size of the coating apparatus 10' has been increased in order to handle larger batch loads or particles for coating treatment. It has been found that it is more practical to add an additional gas shaping or aerodynamic structure or an annular airfoil 50 instead of increasing the size of the aerodynamic structure 30'. In this manner, larger amounts of upwardly flowing gas or air may be supplied undiminished or unobstructed by a larger aerodynamic structure, and the annular airfoil serves to supplement the compression and focusing action on the upward gas flows so that substantially all gas flows move through the truncated hollow cone 14'.

Additional or multiple gas shaping or annular airfoils (not shown) also may be used for still larger coating apparatus. The exact shape and placement of the airfoils are functions of a number of variables. The most significant of the variables are size of the apparatus, size of the particle to be coated, density of the particle, rate of gas or air flow and the rate of recirculation of the particles through the coating zone desired.

In a larger-scale coating apparatus, therefore, one or more annularly shaped and placed gas shaping or aerodynamic structures or airfoils, angled or curved, may be provided concentric with and radially outwardly of the central gas shaping or aerodynamic structure. The annular airfoils may be attached to the central aerodynamic structure or to the walls of the coating apparatus by radial struts in such manner as to exert a minimum deflection of the upwardly flowing gases.

The annular aerodynamic structure is inwardly inclined in the upward direction so that its inclination lies in a plane extending about 10° to about 45°, as measured from the axis perpendicular to the diameter of the coating apparatus. The inwardly inclined annular structure provides a surface on which the gas or air impinges for subsequent shaping and direction upwardly into the truncated hollow cone.

The vertical height of the annular structure may be about 10–50% of the perpendicular cross-section diameter of the coating apparatus.

In reference to FIG. 6, when the annular gas shaping structure has the configuration of an airfoil having at least one curved surface extending generally in the direction of gas flow, the overall angle of a line described from a point, $p_1$, on the lower rim of the airfoil to a point, $p_2$, on the upper rim in the vertical direction, or perpendicular to a line which is tangent to the upper curved surface of the centrally disposed aerodynamic structure, is from about 10° to about 45° inward facing, as measured from the axis perpendicular to the diameter of the coating apparatus.

The cross-sectional configuration of an annular airfoil in a plane described from the center of the cross-sectional area of the coating apparatus to a point, $p_1$, on the lower rim of the airfoil to a point, $p_2$, in the upper rim of the airfoil is teardrop, or similar to the cross-sectional shape of a lifting aerodynamic shape, and having the thicker cross-section on the forward part with reference to the direction facing the upwardly flowing gases. The thickest part is located about two-fifths to about one-half of the height in the vertical direction. In other words, the height (H) of the thickest part (T), or HT is equal to about two-fifths H to about one-half H. The thickest cross-section (T) is from about one-sixth to about two-fifths of the height (H) of the airfoil; or T is equal to about one-sixth H to about two-fifths H.

The size, placement and geometrical configuration of the annular gas shaping structure are such, therefore, that the upwardly flowing gases are deflected radially inwardly at an angle from about 10° to about 45° from a direction parallel to the original gas flow.

FIG. 4 EMBODIMENT

In reference to FIG. 4 in which is presented a further modification of the invention hereinbefore disclosed, the same reference numbers will be used to identify similar elements previously described, except that they will be double-primed to show that it is still another different embodiment under discussion.

FIG. 4 represents an embodiment of the invention wherein the size of the coating apparatus 10'' has been increased to the same extent as that disclosed in the FIG. 3 embodiment. The embodiment in FIG. 4 differs from the embodiment in FIG. 3 in that the first and second hollow columns are disclosed as being co-extensive in cross-sectional diameter. In other words, the coating apparatus is disposed within a single hollow column. It could also be of smaller size so that only one gas shaping or aerodynamic structure 30'' is employed as in FIG. 2, instead of a size requiring the annular airfoil 50''.

The recycling or recirculation in this embodiment is necessarily faster because the particles are not as readily restrained in the annular bed region as they would be if there were an inwardly tapered base to assist in such restraint. Proportionately smaller batch loads may be used, therefore, since the recirculation of the particles is substantially continuous with the particles spending very little time in the annular bed. For this reason, an embodiment of this character is suitable for special purposes, while the embodiments of FIG. 2 and FIG. 3 are deemed to be of more general use.

FIG. 5 EMBODIMENT

In FIG. 5, this embodiment represents one manner of unloading a coating apparatus, and was briefly mentioned above with respect to one possible operation of the embodiment of FIG. 2.

Only the upper portion of a coating apparatus 60 is shown, and it could be used for any of the previously described embodiments of this invention. A conduit 62 is installed within the upper portion of the apparatus, as shown, and a gas or air porous collection bag 64 may be installed at the remote end of the conduit for collecting the finally coated particles in the manner already heretofore described.

OTHER EMBODIMENTS AND ARRANGEMENTS

In any of the embodiments described above, the truncated hollow cones may be adapted to be adjusted for movement upwardly or downwardly in a vertical plane. The same may also be accomplished with the aerodynamic structure, the annular airfoils and the spray nozzles, as desired to suit gas or air flows, particle sizes and weights, coating material consistencies and whatever other controlling factors may be concerned.

The particles or pellets to be coated may be batch-loaded and treated; or if deemed advantageous, two or more such coating apparatus may be arranged in cascaded manner to provide for a continuous coating operation. The inlet for the particles in a cascaded arrangement may be disposed above the annular storage of one apparatus and the particles metered in predetermined manner into the annular storage bed, while the outlet to the next coating apparatus may be disposed on the opposite side of the annular storage bed and constitute a weir for outflow of excess coated particles. The inlet may also be disposed for gravity flow of particles to or into the annular storage bed. It may be desirable to provide for different coatings in different apparatus, or provide supplemental coatings.

One example of a cascaded arrangement of coating apparatus is shown in FIG. 13 of the Wurster et al U.S. Pat. No. 3,241,520.

Multiple spray nozzles may also be employed, as desired, to achieve different coating effects.

The invention has been described in detail with particular reference to preferred embodiments thereof, but it will be understood that variations and modifications can be effected within the spirit and scope of the invention.

We claim:

1. Apparatus for spray coating discrete particles in which upwardly flowing gases continuously move particles from a storage zone, lift them into a coating zone through an atomized spray of liquid coating material for coating of the particles individually, further lift the particles into a drying zone and further separate the particles for solidification of the coating on the particles and still further lift the particles into a deceleration zone for return to the storage zone and subsequent recirculation through the zones, the apparatus comprising:

a hollow column;

a tapered hollow member being open at both ends and being mounted within said hollow column with its larger open end being adjacent one end of said hollow column to form a storage zone for the particles between the inner wall of said hollow column and the outer wall of said tapered hollow member and to form therewithin the coating and drying zones, and to form adjacent its smaller open end in said hollow column the deceleration zone;

a gas plenum assembly for supplying flowing gases to said one end of the hollow column, said gas plenum assembly including an aerodynamic gas shaping structure means for shaping the flowing gases to direct them into and through said tapered hollow member in such a manner as to create a reduced pressure region surrounding said flowing gases to pull the particles from the storage zone and entrain the particles in said flowing gases to transport them through said tapered hollow member and into the deceleration zone in said hollow column for return by gravity into the storage zone;

and a spray assembly for spraying the liquid coating material into the flowing gases immediately downstream of said aerodynamic gas shaping structure means to coat said particles as they are transported through the coating zone by the flowing gases.

2. Apparatus for spray coating discrete particles, as defined in claim 1, wherein the apparatus includes a particle supporting screen extending transversely across said one end of said hollow column between the larger open end of the tapered hollow member and said aerodynamic gas shaping structure means.

3. An apparatus as defined in claim 1, and further comprising annular airfoil means concentrically disposed with respect to and outwardly of the aerodynamic gas shaping structure means.

4. An apparatus as defined in claim 3, wherein the annular airfoil means is inwardly inclined in the upward direction so that its inclination lies in a plane extending about 10° to about 45°, as measured from the axis perpendicular to the cross-section of the hollow column and has a vertical height from about 10–50% of the perpendicular cross-section of the coating apparatus.

* * * * *